No. 782,044. PATENTED FEB. 7, 1905.
E. McGARRAH, Jr.
MACHINE FOR PAINTING MOLDINGS.
APPLICATION FILED MAY 9, 1900.
7 SHEETS—SHEET 1.
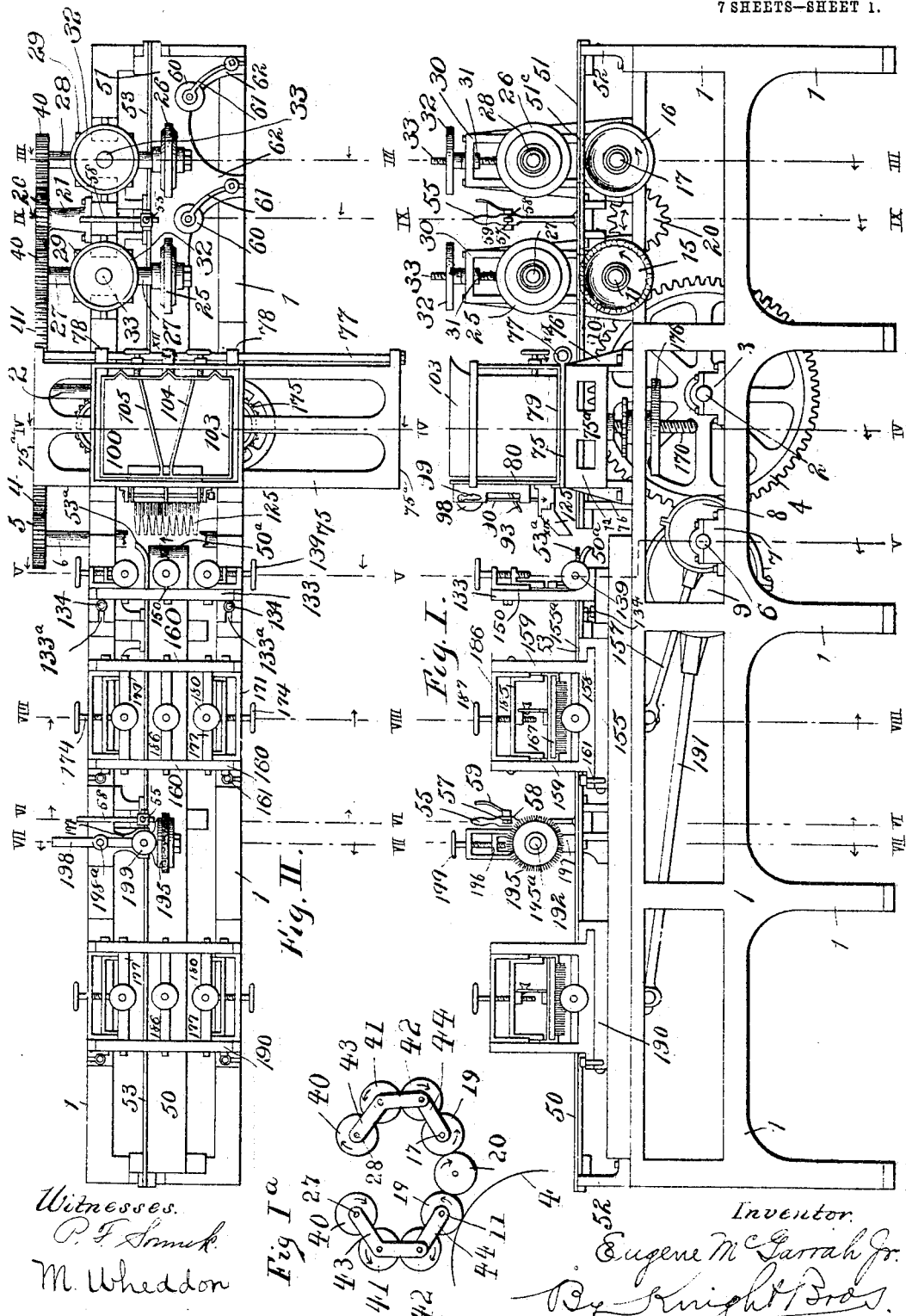

No. 782,044. PATENTED FEB. 7, 1905.
E. McGARRAH, Jr.
MACHINE FOR PAINTING MOLDINGS.
APPLICATION FILED MAY 9, 1900.
7 SHEETS—SHEET 2.
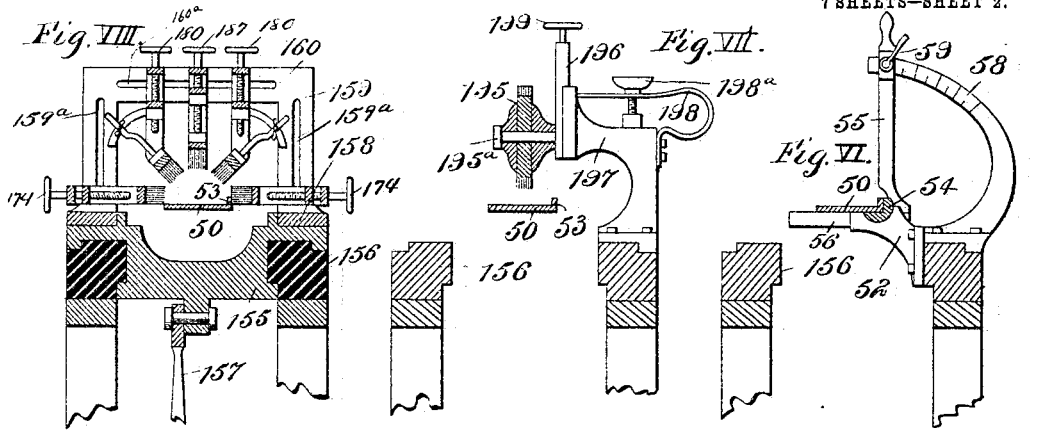
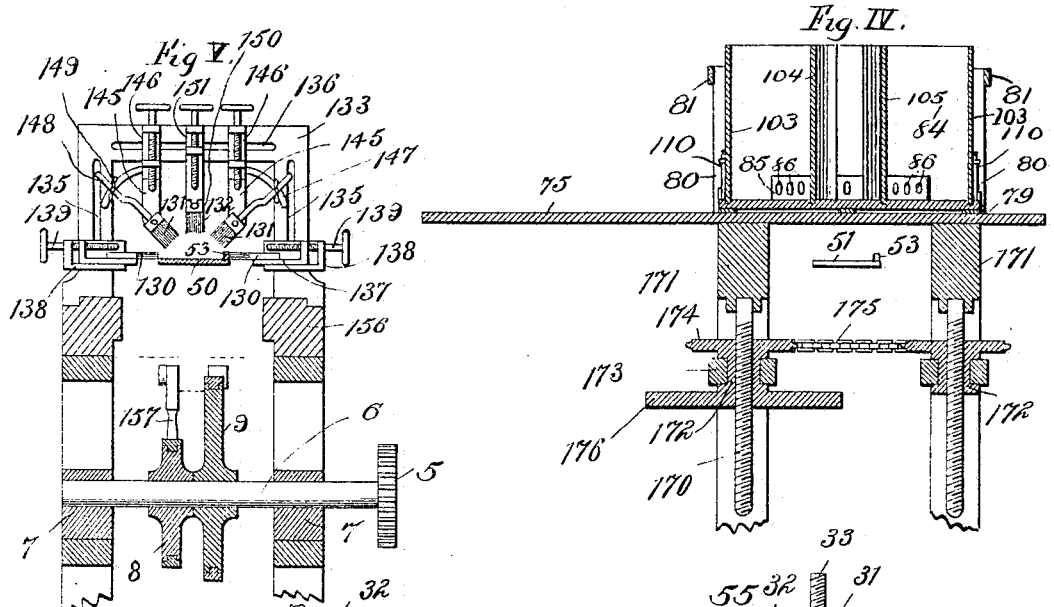
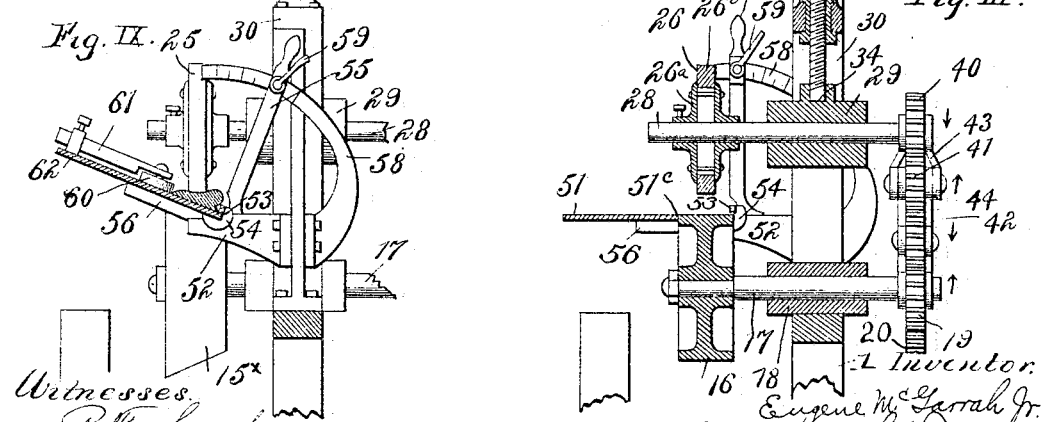
Witnesses.
P. F. Sonnek
M. Wheddon
Inventor.
Eugene McGarrah Jr.
By Knight Bros.
Attys.

No. 782,044. PATENTED FEB. 7, 1905.
E. McGARRAH, Jr.
MACHINE FOR PAINTING MOLDINGS.
APPLICATION FILED MAY 9, 1900.
7 SHEETS—SHEET 3.
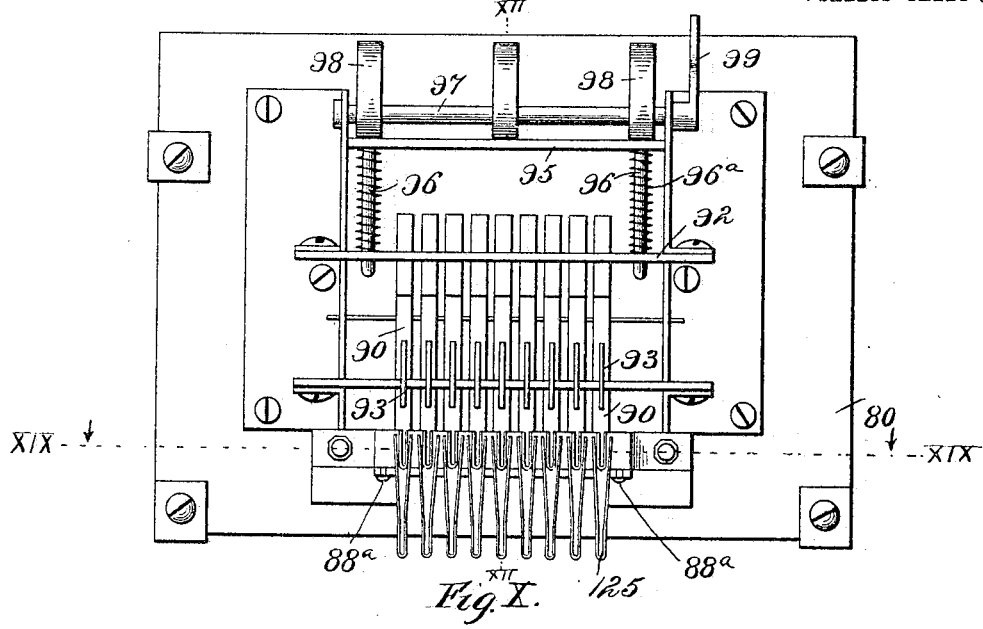
Fig. X.
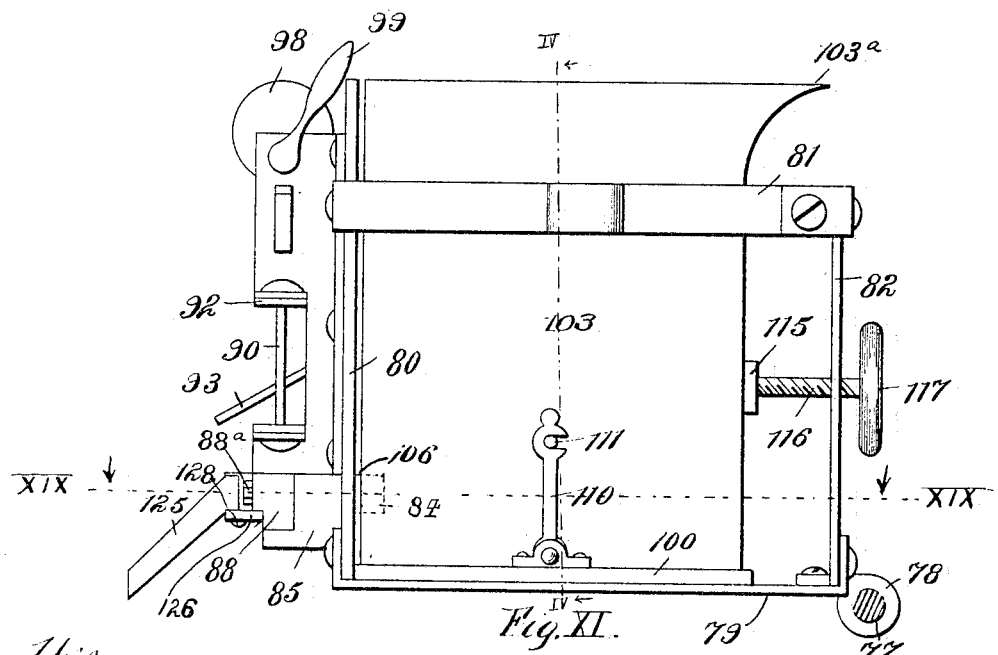
Fig. XI.
Witnesses.
Inventor.
Eugene McGarrah Jr.
By Knight Bros.
Attys.

No. 782,044. PATENTED FEB. 7, 1905.
E. McGARRAH, Jr.
MACHINE FOR PAINTING MOLDINGS.
APPLICATION FILED MAY 9, 1900.
7 SHEETS—SHEET 4.
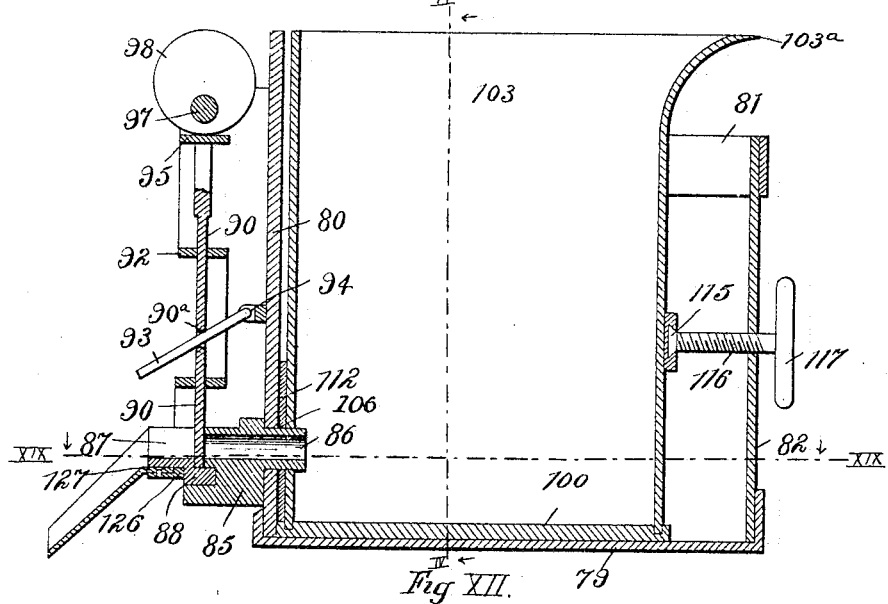
Fig. XII.
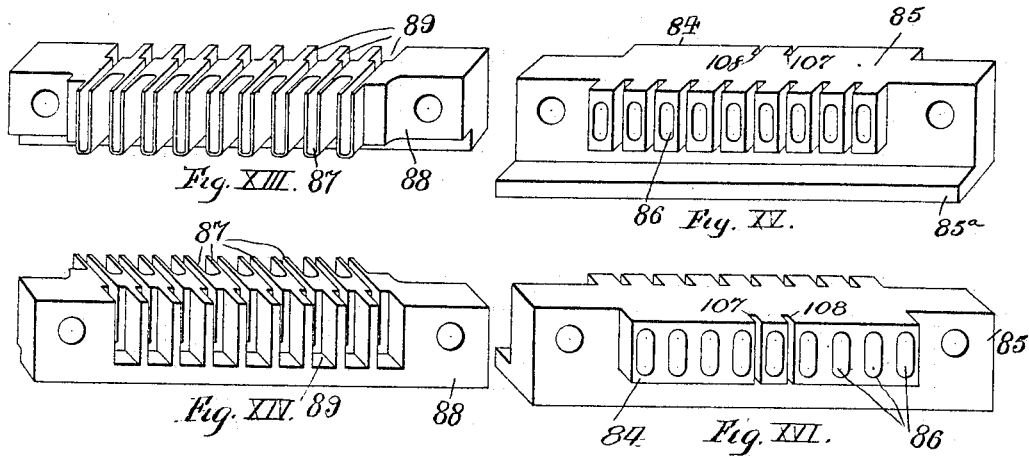
Fig. XIII. Fig. XV.
Fig. XIV. Fig. XVI.
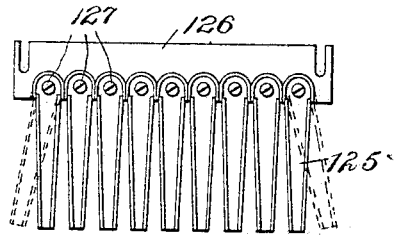
Fig. XVII.
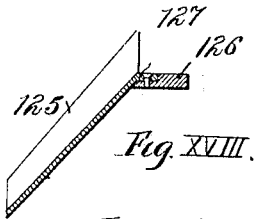
Fig. XVIII.
Witnesses.
R. F. Lomek.
M. Wheddon.
Inventor.
Eugene McGarrah Jr.
By Knight Bros
Attys.

No. 782,044. PATENTED FEB. 7, 1905.
E. McGARRAH, Jr.
MACHINE FOR PAINTING MOLDINGS.
APPLICATION FILED MAY 9, 1900.
7 SHEETS—SHEET 5.
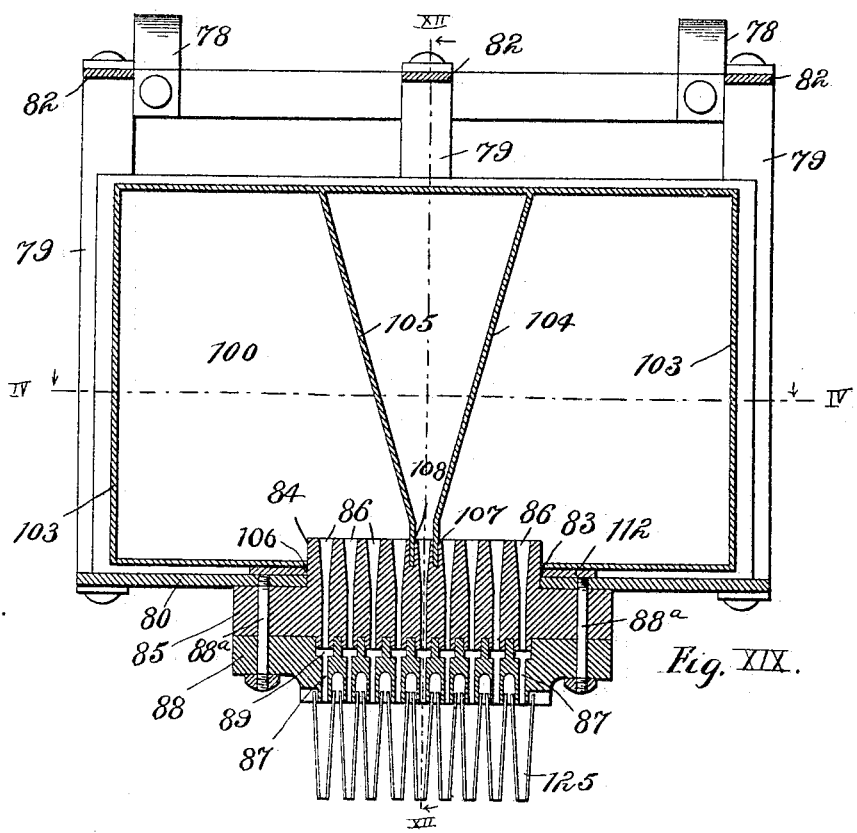
Fig. XIX.
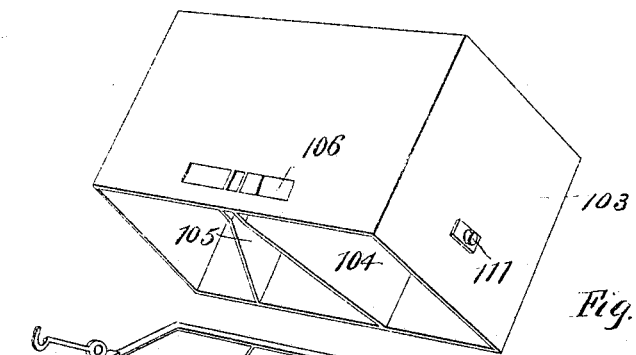
Fig. XX.
Witnesses.
P. F. Somek.
M. Wheddon.
Inventor
Eugene McGarrah Jr.
By Knight Bros.
Attys.

No. 782,044. PATENTED FEB. 7, 1905.
E. McGARRAH, Jr.
MACHINE FOR PAINTING MOLDINGS.
APPLICATION FILED MAY 9, 1900.
7 SHEETS—SHEET 6.
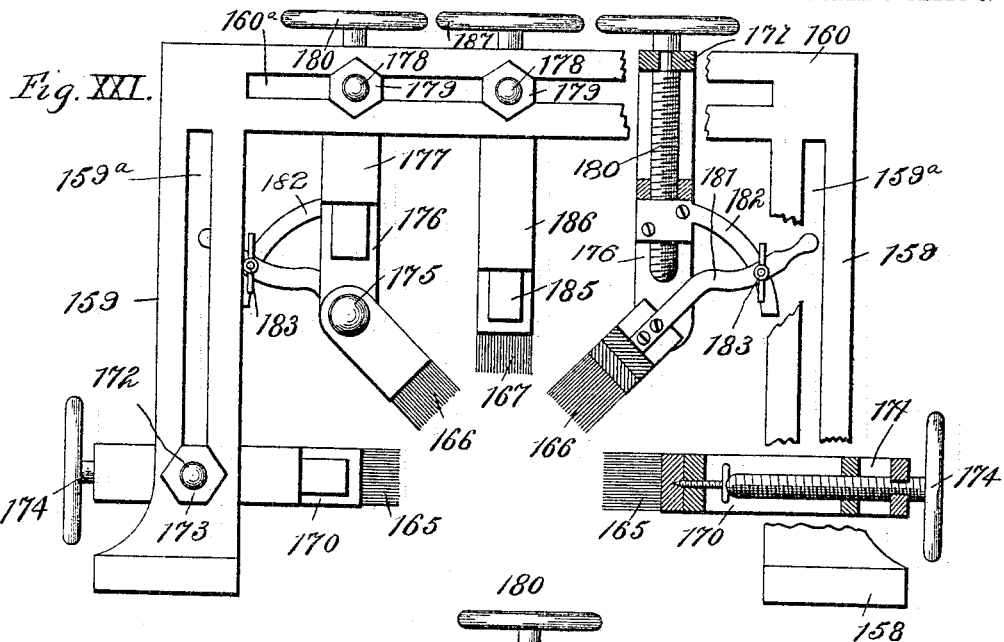
Fig. XXI.
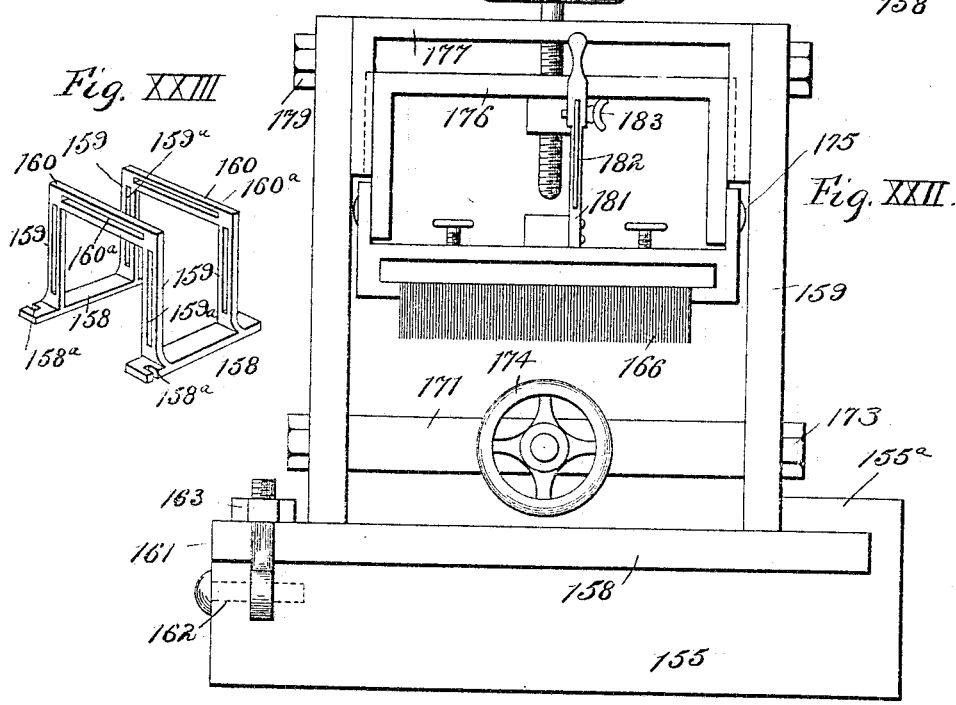
Fig. XXIII.
Fig. XXII.
WITNESSES:
P. F. Sonnek.
M. Wheddon.
INVENTOR
Eugene McGarrah Jr
BY
Knight Bros.
ATTORNEYS No. 782,044. PATENTED FEB. 7, 1905.
E. McGARRAH, Jr.
MACHINE FOR PAINTING MOLDINGS.
APPLICATION FILED MAY 9, 1900.
7 SHEETS—SHEET 7.
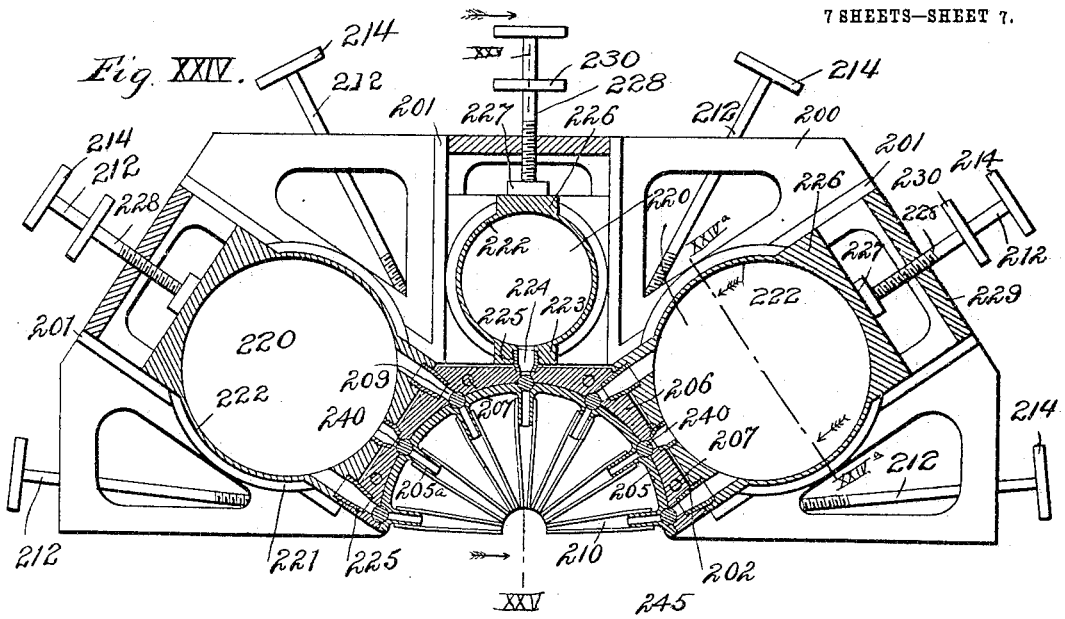
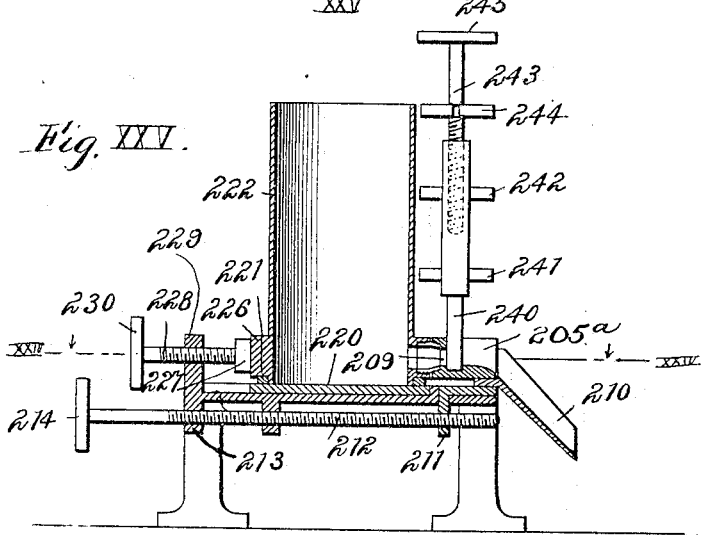
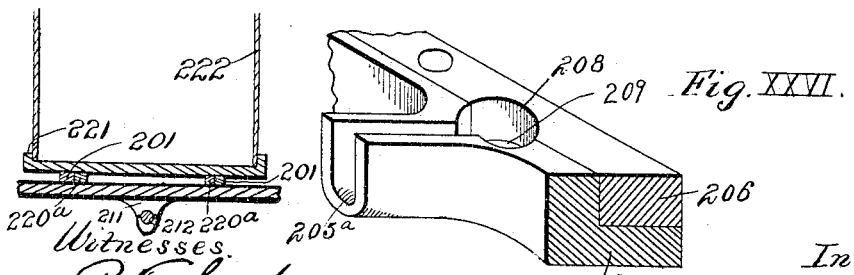

No. 782,044.                                          Patented February 7, 1905.

UNITED STATES PATENT OFFICE.

EUGENE McGARRAH, JR., OF WESTFIELD, NEW JERSEY.

MACHINE FOR PAINTING MOLDINGS.

SPECIFICATION forming part of Letters Patent No. 782,044, dated February 7, 1905.

Application filed May 9, 1900. Serial No. 16,059.

*To all whom it may concern:*

Be it known that I, EUGENE McGARRAH, Jr., a citizen of the United States, residing at Westfield, in the county of Union and State of New Jersey, have invented certain new and useful Improvements in Machines for Painting Moldings, of which the following specification, taken in connection with the accompanying drawings, is a full, clear, and exact description.

My invention relates to improvements in machines for applying to picture-moldings or other moldings of irregular configuration liquid paint, varnish, size, or other materials used for ornamenting and finishing the moldings. Machines for this purpose are commonly constructed with a reservoir containing the paint or other material to be applied to the moldings, suitable brushes for distributing the paint or other material upon the moldings, and suitable feeding devices for carrying the moldings past the reservoir and brushes. The reservoir is usually arranged with a discharge-passage to deposit the liquid paint or other material upon the surface of the moldings in readiness for the action of the distributing-brushes.

The object of my present invention is to simplify and improve such painting-machines to the end that they will do better work and a greater variety of work and can be more conveniently taken apart for repairing or cleaning.

In my improved painting-machine I arrange a bed or platform in the machine-frame which is capable of angular adjustment, so as to support moldings of varying configurations in proper relation to the liquid-supply and the applying and distributing brushes to produce the best results. This adjustable bed or platform is preferably formed of two longitudinally-arranged sections separated slightly adjacent to the discharge-passages of the liquid-supply reservoir or reservoirs to prevent the drippings from said discharge-passages falling upon the supporting-platform and becoming transferred to the under surface of the moldings. The sections of the bed or platform are provided with independent adjusting means by which they can be arranged at the required angle to properly support the particular molding which is to be painted or finished. The reservoir or reservoirs for supplying the liquid paint or other finishing material is detachably mounted upon the machine-frame, and its discharge-passages are formed in sections, which can be readily separated to facilitate the cleaning of the parts. I also arrange the several brushes for applying and distributing the paint or other material in such manner that they may be readily removed from the machine and taken apart for repairing or cleaning. In the preferred operation of my improved machine I employ duplicate sets of reservoirs and brushes in order that the change from one material to another may be rapidly effected. When duplicate sets of these parts of the machine are used, it will be clear that while the machine is performing a job with one set of brushes, reservoirs, &c., a second set can be properly adjusted and gotten ready for the next job to be substituted in the machine without the objectionable delay incident to cleaning the parts of the set which have just been used. The paint-supplying reservoir may be a single reservoir having a plurality of compartments for different materials, colors, or shades, or it may be a series of independent reservoirs for the different materials, colors, or shades. In either case each compartment or independent reservoir is provided with one or more discharge-passages communicating with troughs or spouts which project toward the line of feed of the moldings and are capable of adjustment with relation to the central line of feed so as to effectually apply the paint or other material to molding-strips of different widths. Each of the discharge-passages of the reservoir or reservoirs is provided with an independent gate or valve by which the supply of the material can be regulated or entirely cut off.

My improved machine may be employed for applying to moldings of any irregular configuration water, oil, and enamel colors in one or more shades or in different shades, blending said shades, if desired, or for applying size, varnish, liquid bronze, filling, or other liquid materials that may be required in sizing, varnishing, coloring, bronzing, or otherwise finishing said moldings.

In order that my invention may be fully understood, I will first describe the same with reference to the accompanying drawings and afterward point out the patentable novelty in my machine in the annexed claims.

In the said drawings, Figure I is a side elevation of the machine constructed in accordance with my invention. Fig. I$^a$ is a detail side elevation of the gearing. Fig. II is a top plan view of the machine. Fig. III is a detail transverse sectional view of the feed-rolls, taken on the line III III of Figs. I and II looking in the direction of the arrows. Fig. IV is a similar view of the reservoir-platform, taken on the line IV IV of Figs. I, II, IX, XII, and XIII looking in the direction of the arrows. Fig. V is a similar view of the brush-frame, taken on the line V V of Figs. I and II looking in the direction of the arrows. Fig. VI is a similar view of the supporting-bracket, taken on the line VI VI of Figs. I and II looking in the direction of the arrows. Fig. VII is a similar view of the rotating brush-bracket, taken on the line VII VII of Figs. I and II looking in the direction of the arrows. Fig. VIII is a similar view of a reciprocating brush-frame, taken on the line VIII VIII of Figs. I and II looking in the direction of the arrows. Fig. IX is a similar view of the cone-shaped lower feed-roll and the supporting-platform tilted to properly support an ogee-shaped molding, taken on the line IX IX of Figs. I and II looking in the direction of the arrows. Fig. X is a detail front elevation of the liquid-material-containing reservoir shown in Figs. I, II, XI, XII, and XIX looking in the direction of the arrows. Fig. XI is a side elevation of the same. Fig. XII is a vertical longitudinal section thereof, taken on the line XII XII of Figs. II, X, and XIX looking in the direction of the arrows. Fig. XIII is a perspective view of the outer discharge-block looking at the outer side thereof. Fig. XIV is a similar view of the same looking at the inner side thereof. Fig. XV is a similar view of the inner discharge-block looking at the outer side thereof. Fig. XVI is a similar view of the same looking at the inner side thereof. Fig. XVII is a top plan view of the series of discharge-spouts. Fig. XVIII is a vertical transverse section through one of the spouts. Fig. XIX is a horizontal sectional view of the said liquid-material-containing reservoir, taken on the line XIX XIX of Figs. I, X, XI, and XII looking in the direction of the arrows. Fig. XX is a perspective view of the same, the body being separated from the bottom plate, the discharge-blocks being omitted. Fig. XXI is a front elevation of a reciprocating frame having adjustable brushes and partly broken away. Fig. XXII is a side elevation of the same. Fig. XXIII is a perspective view, on a small scale, of the brush-supporting frame thereof. Fig. XXIV is a detail horizontal section of the preferred form of liquid-material-containing reservoir, taken on the line XXIV XXIV of Fig. XXV looking in the direction of the arrows. Fig. XXIV$^a$ is a detail axial section of a reservoir, taken on the line XXIV$^a$ XXIV$^a$ of Fig. XXIV looking in the direction of the arrows. Fig. XXV is a detail vertical sectional view of one preferred form of liquid-material-containing reservoir, taken on the line XXV XXV of Fig. XXIV looking in the direction of the arrows. Fig. XXVI is a detail sectional perspective view of part of the discharge-blocks of the same.

My improved machine is built up upon any suitable base-frame 1, such as illustrated in Figs. I and II.

2 is the main power-shaft, journaled in bearings 3, mounted upon the main frame, and 4 is a main driving-gear keyed to the shaft 2 at one end and meshing with a similar gear 5, keyed to the end of an eccentric-shaft 6, journaled in bearings 7 upon the machine-frame. The eccentric-shaft 6 carries a small eccentric 8 and a large eccentric 9, which operate through suitable mechanism, hereinafter described, for reciprocating two series of brushes. The main driving-gear 4 also meshes with a small gear 10, as indicated in dotted lines in Fig. I, located immediately beneath the gear 40, Figs. I and II, and keyed to the outer end of a lower feed-shaft 11, which is journaled in a suitable rigid bearing in the machine-frame.

15 is one of a pair of lower feed-rolls, (concealing the small gear 10 in Fig. I,) mounted upon shaft 11 and supported with its periphery in the plane of feed of the molding-strips. 16 is the other one of the pair of lower feed-rolls, also supported with its periphery in the plane of feed and mounted upon the feed-shaft 17, journaled in the rigid bearing 18, mounted upon the machine-frame. (See Fig. III.) The feed-shaft 17 has keyed to it a gear 19, which meshes with an intermediate gear 20, journaled upon a bracket 21, secured to the main frame. (See Figs. I and II.) The gear 20 also meshes with the feed-gear 10, located beneath gear 40, which is driven by main gear 4 and drives the feed-roller 15 so that the feed-rolls 15 16 will be constantly driven at the same surface speed and in the same direction. The feed-roller 15 is mounted in the same way as the feed-roller 16, the latter being better shown in Fig. III, so that the construction and arrangement of both feed-rolls will be fully understood.

Cooperating with the main lower feed-rolls 15 and 16 are the upper adjustably-mounted feed-rolls 25 and 26, mounted upon shafts 27 and 28, journaled in adjustable bearings 29. The construction and manner of mounting the upper feed-roll 25 is the same as the feed-roll 26, which is best illustrated in Fig. III of the drawings. The bearing 29 is mounted in a vertical guideway or yoke 30, having journaled in its upper end a screw-nut 31, having secured to or formed integral with it the hand-wheel 32, a screw-bolt 33 being threaded through the nut 31 and attached at its lower end 34 to the bearing 29. By rotating the hand-wheel 32 forward or backward the bearing 29 and feed-shaft 28 can be adjusted vertically to bring the periphery of the feed-roll 26 nearly to or farther away from the periphery of its companion lower feed-roll 16. The arrangement for adjusting the upper feed-roll 25 with respect to its coöperating lower feed-roll 15 is the same as just described with respect to feed-rolls 26 and 16. Each of the upper feed-rolls 25 and 26 is preferably formed of a sectional hub portion, such as 26ª, adjustably secured to the feed-shaft, and a tread portion 26ᵇ, of rubber or other suitable frictional material, clamped between the sections of the hub portion. The treads or rings 26ᵇ are readily renewed when they become worn and may be changed to suit varying requirements. The upper feed-rolls are adjustable to suit different thicknesses of molding-strips to be operated upon and also to allow the required tilting of the supporting-platform, hereinafter explained. To drive the upper feed-rolls 25 and 26 in unison with the lower feed-rolls 15 and 16 and at the same time allow for the adjustment of the upper feed-rolls with relation to the lower feed-rolls, I provide each of the upper feed-shafts 27 and 28 with a gear 40 at its outer end, which meshes with the gear 41, driven by a similar gear 42, which is in turn driven by the gears keyed to the lower feed-shafts 11 and 17, respectively. (See Figs. Iᵃ and III.) To properly support the intermediate gears 41 and 42 in mesh with their driven and driving gears, respectively, I provide pivotally-connected links 43 and 44, the upper one of which, 43, is journaled to the upper feed-shaft 27 or 28, while the lower one of which, 44, is journaled to the lower feed-shaft 11 or 17. These links are angularly arranged and are capable of lengthening out or folding closer together to accommodate the vertical adjustment of the upper feed-rolls, the gears 41 and 42 being journaled upon the links so as to always remain in mesh irrespective of the adjusted position of the feed-rolls.

By means of the upper and lower feed-rolls just described the molding-strips to be treated in the machine are fed longitudinally to the machine to carry them successively past the operative parts of the mechanism, which I will now describe. The molding-strips are supported as they pass through the machine upon the normally stationary adjustable bed or platform, which is preferably formed in two longitudinally-arranged parts or sections 50 and 51, supported with a small gap or space between their adjacent ends for the purpose hereinafter explained. The section 51 of the platform has cut-out portions at 51ᶜ to allow the lower feed-rolls 15 16 to project through and engage the under surface of the molding-strips.

52 52 are suitable brackets mounted upon the base-frame 1 of the machine at suitable intervals, upon which the sections 50 and 51 of the adjustable platform are supported. Each part of the platform 50 and 51 is formed at one edge with a vertical guide-flange 53, against which one edge of the molding-strip is guided in its passage through the machine, and the rear end of section 50 is formed with a downwardly-curved lip 50ª and its guide-flange 53 with an outwardly-curved lip 53ª to avoid interference of the forward end of the molding-strip therewith in its passage from the rear section 51 of the platform. Suitable bearing-blocks 54 are attached to the adjustable platform 50 51 at its guide edge, such bearing-blocks resting in suitable bearing-recesses formed in the upper faces of the brackets 52, and upon these bearings the two sections of the platform 50 51 can be adjusted to any desired angular position.

55 55 are two hand-levers, each formed with an angular projection 56 extending beneath and by which it is rigidly secured to the section 50 or 51 of the adjustable platform. Each hand-lever 55 is formed with an opening 57, through which extends a segment-arm 58, projecting from one of the rigid parts of the machine-frame.

59 is a clamping device mounted upon the hand-lever 55 and adapted to clamp it in any desired adjustable position upon the segment-arm 58. The segment-arms 58 are marked with corresponding scales or indications to insure placing both parts of the adjustable platform in the same angular position.

Each of the platform-sections 50 and 51 is provided with an adjusting mechanism such as just described, by which the sections of the platform can be adjusted and secured in the proper angular position to support the molding-strips which are being operated upon.

In addition to the guide-flange 53 of the adjustable platform I find it necessary to provide guide-rolls to engage the opposite edge of the molding-strip so as to effectively hold it in proper position upon the platform as it passes through the machine. I employ horizontal guide-rolls, such as 60, mounted upon the adjustable arms 61, which are supported upon projections 62 of the platform, as shown in Figs. II and IX of the drawings, so that they will engage one edge of the molding-strip and support it in position against the guide edge 53 of the supporting-platform.

In operating upon a molding of ogee shape, as shown in Fig. IX of the drawings, the sections of the platform 50 51 are adjusted to the proper angle to present the irregular upper surface of the molding most effectively to the action of the upper feed-roll 25. When such a molding is being operated upon, I prefer to substitute for the cylindrical lower feed-rolls (shown in Figs. I and III) conical feed-rolls such as shown at 15ˣ in Fig. IX, in which case the cone-surfaces of said lower feed-rolls will correspond to the angular position of the molding-strip and effectively engage it and support it to the action of the upper feed-rolls.

After the molding-strips leave the feed mechanism above described they pass beneath the reservoir which contains the liquid material which is to be applied to the surface of the molding. This reservoir may be constructed and arranged as illustrated in Figs. I, II, and X to XX or as illustrated in Figs. XXIV, XXIVᵃ, XXV, and XXVI; but I prefer the latter construction. In either case the independent reservoirs or reservoir-compartments have one or more discharge-passages each, which lead to the distributing troughs or spouts from which the liquid paint or other finishing material flows upon the molding-strips. The discharge-passages and troughs are made in sections, and the reservoirs are detachably mounted to facilitate repairing and cleaning the parts. Each discharge-passage is also controlled by an independent gate or valve, and the troughs or spouts are adjustable to suit moldings of different widths. I will now proceed to describe this part of my machine, referring first to the form illustrated in Figs. I, II, and X to XX. 75 is a laterally-projecting auxiliary frame or platform suitably mounted upon brackets 76, supported upon the main frame. This auxiliary frame or platform 75 is provided at its rear edge with a rigid bolt 77, upon which the ears 78 of the reservoir-supporting frame 79 are journaled. The construction of this reservoir-frame is best shown in Figs. X, XI, XII, and XIX of the drawings, in which it comprises a suitable front plate 80, a top frame 81, the rear vertical bars 82, and the horizontal base-bars 79. In the face-plate 80, near its lower edge, is formed a rectangular opening 83, into which fits the rectangular projection 84 of a block 85. The block 85 has formed in it a series of horizontal passage-ways 86, which communicate with open troughs or passages 87, formed in a block 88, which is fitted to and secured in close contact with the outer face of the block 85. The blocks 85 and 88 are formed with corresponding tongues and grooves which fit one within the other to form a tight joint, and said blocks are secured together upon the front plate 80 by means of bolts 88ᵃ. At the junctions of the passages 86 and 87 are formed vertical recesses 89, in which operate the vertically-movable gates or valves 90. The gates or valves 90 are suitably mounted in a frame 92 attached to the front plate 80, and each gate or valve 90 is provided with an operating-lever 93, journaled to front plate 80 at 94 and extending through opening 90ᵃ in the bar of the gate or valve, by which the gates can be independently raised or lowered. 95 is a cross-bar supported upon vertical guide-rods 96, which cross-bar and guide-rods work in suitable guide-openings in frame 92. 97 is a shaft journaled in frame 92 and carrying a series of eccentrics or cams 98 which are adapted to engage the cross-bar 95 and force it downwardly to cause said cross-bar to engage the upper ends of the valves or gates 90 and force them all downwardly into closed position at the same time. 99 is a hand-lever keyed to the end of shaft 97, by means of which eccentrics 98 are operated. 96ᵃ represents springs holding bar 95 normally elevated. The reservoir or receptacle comprises a bottom plate 100, adapted to rest upon the base-frame 79, above referred to, and formed with a rectangular outer groove 101 and the partition-grooves 102 in its upper face, and a rectangular casing 103, formed with partition-walls 104 and 105, which divide the reservoir into three compartments. The casing 103 fits upon the base-plate 100, the side walls engaging in the grooves 101 and the partition-walls 104 and 105 engaging the grooves 102, thereby forming a liquid-tight joint with the bottom of the casing. The front of the casing 103 is cut out at 106 to receive the projection 84 of the block 85, the block 85 being formed with grooves 107 and 108 to receive the engaging partition-walls 104 and 105. When the reservoir is put in place, it will be observed that the casing 103 and bottom plate 100 are held securely together by means of hooks 110, journaled upon the bottom plate and adapted to engage the pins 111 upon the casing. The reservoir is supported upon the bottom plate 79 of the frame and is engaged upon its rear face by a follower 115, mounted upon a screw 116, threaded into the central vertical bar 82 and provided with a hand-wheel 117. By rotating the screw 116 the reservoir will be forced forwardly in its supporting-frame until the projection 84 of the block 85 is brought into intimate contact with the reservoir, a gasket or packing 112 being preferably interposed between the reservoir and front plate 80, as shown. 125 indicates the inclined spouts or troughs which may be formed as illustrated in Figs. XII, XVII, and XVIII of the drawings, each of the spouts 125 being journaled upon the plate 126 by means of a screw 127, the plate 126 being secured to the block 88 by means of screws or pins 128. The spouts 125 form continuations of the passage-ways 86 87, and by reason of their pivotal connections with their supporting-plate it will be observed that they can be adjusted to a limited degree transversely of the machine. In other words, the spouts can all be brought close together upon opposite sides of the central line of the machine, so as to distribute the paint or the liquid material upon a narrow molding-strip, or they can be spread apart, so as to distribute the paint upon a wider molding-strip. When it is desired to remove the paint or other material contained in the reservoir, the supporting-frame is moved to one side upon the platform 75, the ears 78 of the reservoir-frame sliding upon the bar 77, when by tilting the reservoir-frame upon bar 77, the liquid paint or other material can be poured out of the several compartments of the reservoir in suitable receptacles. The upper rear edge of the reservoir may be formed with spouts $103^a$ to facilitate the pouring of the material. After the material is removed from the reservoir it is preferable to take the reservoir from the frame and clean the several parts. When it is desired to economically and quickly change the color or material which is being employed for finishing the molding-strips, it is preferable to employ duplicate reservoirs and attachments, so that one set may be removed and a clean set put in place without the delay of cleaning up the parts of the set which has just been used. It will be observed that the reservoir is detachably mounted upon its supporting-frame, and the discharge passages and spouts are made in sections, so that all of the parts can be conveniently separated and effectively cleaned. I consider this a very important feature in my machine, as it enables the operator to change rapidly from one job to another without the troublesome and expensive delays incident to the use of other machines. I prefer to provide means for adjusting the reservoir-supporting platform vertically with relation to the bed of the machine, and for this purpose the platform 75 is formed with depending brackets $75^a$, which engage and slide upon the brackets 76, and is supported vertically by screws 170, which engage blocks 171 beneath the platform and pass through nuts 172, journaled in bearings 173 of the machine-frame. Sprocket-wheels 174 are formed integral with the nuts 172 and are connected by means of sprocket-chains 175. One of the nuts 172 has formed integral with it a hand-wheel 176, by means of which both screw-nuts 172 can be rotated simultaneously for raising or lowering the platform supporting the reservoir. By this adjusting means the paint-reservoir may be raised or lowered with respect to the plane of feed of the moldings to suit the size of the moldings and other varying requirements.

As hereinbefore explained, the molding-supporting platform 50 51 is arranged with the sections separated to form a small gap or space between them directly beneath the discharge-spouts of the paint-reservoir. The purpose of this is to allow any drippings from said spouts to fall free of the platform. A suitable receptacle may be provided to catch these drippings. This feature is important, because it prevents the possibility of the paint being smeared upon the under surface of the moldings.

Referring now to Figs. XXIV, XXIV$^a$, XXV, and XXVI of the drawings, I will describe another form of liquid-paint-supplying device. This form of a device is, in fact, the one which I prefer to use in practically using my invention. The general principles involved in the construction of this form of the mechanism are the same as those employed in the device first described. In place of the reservoir-supporting frame projecting to one side of the main frame to enable the reservoir to be moved laterally for emptying, as above described, I employ in this preferred form a skeleton frame 200, arranged above the main frame of the machine and projecting equally to both sides. This skeleton frame is formed with a plurality of guide-rails 201 for the purpose which I will presently explain and is centrally cut out at its forward edge 202 to receive a sectional auxiliary frame of approximately semicircular shape. This frame is made up of sections 205 and 206, and the sections are securely held together and fastened to the supporting-frame 200 by means of bolts 207. The section 205 is formed with a series of integral spouts $205^a$, which project from the inner edge of said sectional frame in approximately radial directions. 208 indicates a series of vertical openings formed in the adjacent faces of the sections 205 206 of said frame, and 209 represents horizontal passage-ways formed between said sections and communicating with the spouts 210. The inner ends of the passages 209 are tapered for the purpose presently to be explained. 210 indicates a series of inclined troughs or spouts, which are mounted upon adjustable sliding brackets 211 in the supporting-frame 200, each of said brackets 211 being engaged by an adjusting-screw 212, which is journaled in bearings 213 and is provided with a hand-wheel 214. It will be observed that the adjustable troughs or spouts 210 rest directly beneath the spouts $205^a$ of the frame-section 205, so that any liquid flowing out of spouts $205^a$ would fall into the troughs or spouts 210 and be carried to the desired point of deposit. The troughs or spouts 210 are arranged in approximately radial position within the auxiliary sectional frame 205 and 206, and it will be observed that by adjusting said troughs or spouts 210 longitudinally their discharge ends can be brought closer together directly above the plane of feed of the moldings or farther apart above said plane, so that the liquid paint flowing through them can be deposited upon a narrow or a wide surface. The plurality of liquid-paint reservoirs are supported upon the frame 200 in the manner which I will now describe. Each reservoir (and I have shown three) comprises a rectangular base-plate 220, formed with a ring or circular flange 221 upon its upper face, and a cylindrical body portion 222, which rests snugly upon the base portion within the ring or circular flange 221. The base-plate 220 is of the proper size to rest between a pair of the guide-rails 201 of the supporting-frame. In case the reservoirs are of greater diameter than the distance between the guide-rails—such, for instance, as the large reservoir at the sides of Fig. XXIV—the base-plate 220 is formed with guide-rails 220ª upon its under face, which fit between the rails 201, while the main portion of the base is extended beyond the rails 201, as shown in Fig. XXIVª. The body portion 222 of the reservoir is formed with a thickened front portion 223 upon its forward face adjacent to its lower edge, through which thickened portion is formed a discharge-opening 224, within which is threaded a ring or nipple 225, having a conical outer end, which projects from the thickened face portion of reservoir-body. This nipple or ring 225 is adapted to be forced snugly into engagement with the tapered opening of one of the passages 209, formed between the sections 205 and 206 of the auxiliary frame, so as to form a liquid-tight communication with the said discharge-passage. Upon the rear face of the reservoir body portion adjacent to its lower end is a thickened portion 226, with which engages a block or follower 227, carried upon the forward end of an adjustable clamping-screw 228, threaded through a flange or wall 229 of the supporting-frame and having at its outer end a hand-wheel 230. By rotating the screw 228 it will be observed that the reservoir can be forced forwardly in the supporting-frame to effect a snug engagement between the nipple 225 and discharge-passage in the auxiliary frame. The clamping-screw will then hold the reservoir in place. It will be observed from Fig. XXIV that I have shown a supporting-frame arranged to receive three liquid-paint reservoirs, the two large reservoirs being arranged at the sides, while the smaller one is arranged in the center. This is for the purpose of applying three different shades or colors upon a molding-strip at the same time. The large reservoirs are formed with three discharge-openings each, which communicate with three discharge-passages in the auxiliary frame, while the small reservoir is provided with only one discharge-passage communicating with one of the discharge-passages of the auxiliary frame, making seven discharge-passages for supplying liquid paint or other material to the moldings. 240 represents a series of independent vertically-movable gates or valves, which are guided in suitable frame-pieces 241 242, arranged above the auxiliary sectional frame 205 206. These valves or gates operate in the openings 208, formed between the sections of frame 205 206 and are adapted to control the flow of liquid paint through the discharge-passages. For the purpose of opening and closing these valves or gates any suitable hand-operated device may be employed. I have shown screws 243, journaled at 244, formed with hand-wheels 245 and threaded into the upper ends of the valves or gates 240. In this manner the valves or gates are independently controlled, so that any one or more of the discharge-passages leading from the reservoir may be cut off or the supply through said passages regulated to suit the requirements of the particular piece of work being performed.

The paint-supplying device just described is designed to take the same place in the machine as the device above described, and illustrated in Figs. I, II, and X to XX.

The molding-strips under the action of the feed-rolls, which were above described, pass beneath the several paint-spouts 125 or 210 and have applied to their upper surface the paint, varnish, size, or other liquid material which is being used for finishing, only so many of the spouts being open as are necessary to supply the requisite amount of color or other material to the surface of the strip. As the forward end of the molding-strip passes beneath the paint-spouts it is guided onto the bed-section 50 by the curved lips 50ª and 53ª. Immediately after receiving the liquid paint the molding-strip passes beneath a series of adjustable brushes 130, 131, and 132, which are vertically and horizontally adjustable with relation to the path of the molding in the manner which I will now explain. (See Figs. I, II, and V.) 133 is a frame mounted upon the main frame of the machine and supporting the said brushes around the path of the molding. The frame 133 projects vertically from the machine-frame and may be adjusted longitudinally thereon, any suitable means being provided to secure it in place—such, for instance, as set-bolts 134, threaded into the base-frame 1 and engaging the slotted base portions 133ª of said frame, as shown in Fig. II of the drawings. The vertical side bars of said frame are formed with slots 135, and the horizontal cross-bar (at the top) is formed with a slot 136. The horizontal brushes 130 are mounted upon sliding arms 137, mounted upon brackets 138, which are mounted upon bolts, (not shown,) which pass through slots 135 and secure said brackets and the brushes supported thereby in any desired adjusted position vertically upon the frame. 139 represents adjusting-screws mounted upon brackets 138 and engaging arms 137 to adjust the brushes 130 laterally of the machine. The brushes 131 are journaled upon arms 145, which are vertically adjustable upon brackets 146, which are mounted upon bolts, (not shown,) which pass through the slot 136 of the frame 133 and support them thereon in the desired horizontally-adjusted position. A segment-arm 147 projects from bracket 146 and an arm 148 projects from the brush 131 into engagement with arm 147 and is provided with a clamping device 149 for securing the brush in the desired angular position upon its arm 145. The brush 132 is mounted upon an arm 150, which is adjustably mounted upon a bracket 151. The bracket 151 is mounted upon the frame 133 between brackets 146 in the same manner as said brackets 146. The brushes 130, 131, and 132 are for the purpose of spreading or distributing the liquid paint or other material upon the surface of the molding-strips. The brushes are held stationary in the desired adjusted position and the moldings are fed past them. The molding next passes beneath a reciprocating series of adjustable brushes. (Shown in Figs. I, II, VIII, XXI, XXII, and XXIII.) 155 is a reciprocating base-frame suitably mounted upon tracks 156, formed on the main frame of the machine and connected through the link 157 with the eccentric 8, mounted upon shaft 6, above referred to, by means of which the base-frame 155 is reciprocated in the machine. Detachably secured to the reciprocating base-frame 155 is a rectangular frame in which are mounted a series of elongated brushes having suitable means for adjusting them with relation to the path of the molding-strip. The rectangular brush-frame comprises the base portions 158, supporting the uprights 159, which are connected at the top by the cross-bars 160. The uprights and cross-bars are formed with longitudinal slots 159ª and 160ª, respectively. One end of each of the base portions 158 fits beneath an overhanging lug 155ª of the reciprocating base-frame 155, the opposite ends of said base portions 158 being notched at 158ª to receive eye-bolts 161, journaled to the base-frame 155 upon pins 162 and carrying adjustable nuts 163, which can be screwed down tightly into engagement with base portions 158 to securely hold the rectangular brush-supporting frame upon the reciprocating base 155.

165, 166, and 167 represent the elongated brushes. The two brushes 165 are arranged horizontally, each of them being attached to a sliding frame 170, mounted in a yoke 171, which rests horizontally between two of the uprights 159 and is adjustably secured therein by means of bolts 172 passing through the slots 159ª and engaged by nuts 173. By this means said brushes can be adjusted angularly or vertically in their supporting-frame. Hand-screws 174, journaled in the adjustable yokes 171, engage the sliding frames 170 and adjust the brushes inwardly or outwardly. Each of the brushes 166 is journaled at 175 to a vertically-movable slide-frame 176, mounted in a yoke 177, which rests between the cross-bars 160 and is supported therein by bolts 178, which pass through the slots 160ª and are held therein by nuts 179. The yokes 177 can be adjusted transversely of the machine. Hand-screws 180, journaled in the yokes 177, engage the sliding frames 176 and serve to adjust the brushes vertically. Each brush 166 has attached to it a rigid arm 181, which projects toward a rigid segment-arm 182 of the frame 176, a clamping device 183 being provided to secure said arms together for holding the brush in the desired angular position. The central brush 167 is attached at the lower end of a sliding frame 185, which is mounted in a yoke 186, adjustably supported upon the cross-bars 160 in the same manner as the yokes 177 just described. A hand-screw 187 is also provided for regulating the vertical position of brush 167, the yoke-frame being transversely adjustable the same as the yokes 177. The reciprocating brushes 165, 166, and 167 serve to rub the paint or other material into the surface of the molding-strips and spread it evenly, and when blending is desired they effectually blend the several shades or colors.

190 is a reciprocating frame connected through link 191 with the eccentric 9 upon the shaft 6, by which the frame 190 is given a reciprocatory motion. Mounted in the frame 190 is a series of adjustable brushes 192, which are constructed and adjustably arranged upon the reciprocatory frame substantially the same as the brushes 165, 166, and 167 above described. These brushes and their supporting-frame are detachably mounted in order that they may be cleaned or repaired.

195 is a rotary brush journaled upon a rigid shaft 195ª, mounted in a vertically-movable block 196, which slides in bracket 197 and is engaged by a leaf-spring 198, confined by an adjusting-screw 198ª passing through the spring and threaded into bracket 197. A hand-screw 199, mounted in the block 196, engages the brush-supporting shaft 195ª in the block 196 for adjusting the shaft 195ª up or down in the block and holding it in the desired position, and the spring 198 holds the block 196 downwardly with a yielding pressure. The brush 195 is located between the two series of reciprocating brushes above described, and it acts as a stippling-brush and also serves to hold down the molding-strips upon the platform. It is also desirable to employ several horizontally-journaled rollers to engage the upper face of the molding-strips to hold them down, this being particularly necessary when operating upon crooked or warped strips.

The operation of the machine will be clear from the above description.

It will be observed that I have arranged the liquid-paint reservoirs with perfectly straight discharge-passages from end to end. This is important, because it lessens the chance of clogging the passages and renders them convenient for removing any obstructions which may by chance lodge in them.

By the employment of the liquid-paint reservoirs having a plurality of independent discharge-passages formed with adjustable troughs I am enabled to apply to a molding-strip of any size a plurality of paints or other liquid materials in a single operation. The several liquid materials may be arranged upon the moldings in the desired designs and various shades and color may be combined and blended to suit the taste of the designer.

The use of duplicate sets of brushes, reservoirs, &c., is important because of the great saving of time. While the machine is completing one job with one set of brushes, reservoirs, &c., the duplicate set is not only cleaned, but is set up on a dummy-bed over a piece of the molding of the next job to be painted, and the several parts are accurately adjusted and clamped in position in readiness to be transferred to the bed of the machine when the first-named job is completed. With such an arrangement the only time lost is that required for removing one set of brushes, reservoirs, &c., and placing the duplicate adjusted set in position upon the machine. This saving of time is of great importance in the economical performance of the work.

By the expressions "liquid-paint supply" and "liquid-paint reservoir" employed in my claims I mean to cover any supply or reservoir adapted to contain liquid paint, varnish, size, filling, or other liquid or semiliquid material which can be flowed upon the surface of the molding-strips or other articles which can be fed through my improved machine.

Having thus described my invention, the following is what I claim as new therein and desire to secure by Letters Patent:

1. The combination with suitable feeding mechanism, a suitable liquid-paint supply, and suitable brushes arranged to apply and distribute the liquid paint upon the surface of the moldings or other articles fed through the machine, of a supporting bed or platform over which the moldings or other articles are passed, and means for adjusting the angular position of said platform in the machine, substantially as and for the purpose set forth.

2. The combination with suitable feeding mechanism, a suitable liquid-paint supply, and suitably-arranged brushes to apply and distribute the paint upon the surface of the moldings or other articles fed through the machine, of a supporting bed or platform adjustably mounted upon suitable bearings in the machine-frame, and means for adjusting the angular position of said platform upon its bearings, substantially as and for the purpose set forth.

3. The combination with suitable feeding mechanism, a suitable liquid-paint supply, and suitable brushes arranged to apply and distribute the liquid paint upon the surface of the moldings or other articles fed through the machine, of a suitable bed or platform extending longitudinally through the machine, suitable bearings upon which said longitudinally-extending platform is mounted, suitable adjusting-arms attached to the platform by which the angular position of the platform can be changed, and means for securing said bed or platform in any desired adjusted position, substantially as and for the purpose set forth.

4. In a machine of the character described, the combination of a suitable feeding mechanism, a suitable liquid-paint supply, suitable brushes adapted to apply and distribute the liquid paint upon the moldings or similar articles, and a sectional supporting bed or platform the sections of which are arranged longitudinally in the machine leaving a gap or space between their adjacent ends directly beneath the discharge-passage of the liquid-supply, substantially as and for the purpose set forth.

5. In a machine of the character described, the combination of suitable feeding mechanism, a suitable liquid-paint supply having a discharge passage or passages for depositing liquid paint upon the surface of the article to be painted, suitable brushes adapted to distribute the paint upon the surface of said article, and a sectional supporting bed or platform, the sections of which are arranged longitudinally in the plane of feed leaving a gap or space between their adjacent ends located beneath the discharge-passage of the liquid-paint supply, one of said sections having a downwardly-curved lip or flange upon its end adjacent to the other section to guide the molding-strip or other article thereupon, substantially as set forth.

6. In a machine of the character described, the combination of suitable feeding mechanism, a suitable liquid-paint supply having a discharge passage or passages for depositing liquid paint upon the surface of the article to be painted, and suitable brushes adapted to distribute the paint upon the surface of said articles, with a sectional supporting bed or platform, the sections of which are arranged longitudinally in the machine with a gap or space between their adjacent ends directly beneath the discharge-passage of the liquid-paint supply, guide-flanges at one edge of said sectional supporting bed or platform, and an outwardly-curved lip at the end of said guide-flange on one of said sections adjacent to the other section, substantially as and for the purpose set forth.

7. In a machine of the character described, the combination of a suitable supporting bed or platform, feeding mechanism adapted to feed molding-strips or similar articles through the machine upon said bed or platform, a suitable liquid-paint supply arranged to discharge liquid paint upon the surface of said moldings or other articles, a stationary series of brushes adapted to spread or distribute the paint upon the surface of said articles as they are fed through the machine, a rotating stippling-brush arranged to engage the painted surface of the passing molding-strips, and a reciprocating series of brushes adapted to further distribute or apply the paint to said articles, substantially as and for the purpose set forth.

8. In a machine of the character described, the combination of suitable means for feeding moldings or other objects through the machine, a liquid-paint supply having a plurality of paint-compartments, discharge-passages leading from said compartments toward the plane of feed of the moldings, means for regulating the flow of paint through said discharge-passages, adjustable troughs communicating with said discharge-passages and adapted to direct the liquid paint to the desired points in the line of feed of the moldings, and paint-applying brushes adapted to distribute the paint upon the moldings, substantially as and for the purpose set forth.

9. In a machine of the character described, the combination of suitable feeding mechanism, and suitable paint-applying brushes, with a liquid-paint supply formed with sectional discharge-blocks having troughs or passages, the sections of which are detachable for cleaning and being interlocked, substantially as and for the purpose set forth.

10. In a machine of the character described, the combination of suitable feeding mechanism, and suitable paint-distributing brushes, with a frame or platform, a liquid-paint reservoir adjustably mounted upon said platform, and discharge troughs or passages formed in detachable sections and communicating with said reservoir, substantially as and for the purpose set forth.

11. In a machine of the character described, the combination of suitable feeding mechanism, and suitable paint-brushes, with a liquid-paint reservoir having discharge-passages, and adjustable spouts or troughs communicating with said discharge-passages, substantially as and for the purpose set forth.

12. In a machine of the character described, the combination of suitable feeding mechanism, and suitable paint-distributing brushes, with a supporting-frame for a liquid-paint reservoir, a reservoir detachably mounted in said frame, a discharge-passage formed in the frame, a discharge-opening in the reservoir communicating with said discharge-passage, and a spout or trough leading from the discharge-passage toward the plane of feed of the moldings, substantially as set forth.

13. In a machine of the character described, the combination of suitable feeding mechanism, and suitable paint-brushes, with a reservoir-supporting frame, a sectional frame mounted upon said supporting-frame and formed with discharge-passages through it, parts of said passages being formed in each of the sections of said frame, troughs or spouts from said discharge-passages, and a liquid-paint reservoir detachably mounted in said supporting-frame and formed with discharge-openings which communicate with the discharge-passages of said sectional frame, substantially as set forth.

14. In a machine of the character described, the combination of suitable feeding mechanism and suitable paint-brushes, with a reservoir-supporting frame formed with paint-discharge passages, a reservoir detachably mounted in said frame and formed with discharge-openings which communicate with said discharge-passages, and independent valves or gates controlling the said discharge-passages, substantially as set forth.

15. In a machine of the character described, the combination of suitable feeding mechanism and suitable paint-brushes, with a reservoir-supporting frame, a sectional reservoir mounted upon said frame and comprising a bottom plate resting upon the frame, and a body portion snugly fitting the bottom plate, a discharge-passage leading from said reservoir through the supporting-frame, means for securing the reservoir in this supporting-frame, and means for controlling the flow of liquid through said discharge-passage, substantially as set forth.

16. In a machine of the character described, the combination of suitable feed mechanism, and suitable paint-brushes, with a reservoir-supporting frame formed with guide-rails and a discharge-passage, a sectional reservoir comprising a bottom plate which rests upon said supporting-frame and engages the guide-rails, and a body portion fitting snugly upon the bottom plate and formed with a discharge-opening which is adapted to communicate with the discharge-passage of the supporting-frame, and means for clamping the sectional reservoir in place upon its supporting-frame, substantially as set forth.

17. In a machine of the character described, the combination of suitable feeding mechanism, and suitable paint-brushes, with a reservoir-supporting frame formed with a plurality of guide-rails, an auxiliary sectional frame mounted upon said supporting-frame and formed with discharge-passages through it, a plurality of liquid-paint reservoirs each comprising a base portion and a body portion snugly fitted together, the base portions of said reservoirs being adapted to rest upon the supporting-frame and engage pairs of the guide-rails, and the body portions of said reservoirs being formed with discharge-openings which are adapted to be placed in communication with the discharge-passages of said sectional frame, means for securely clamping said sectional reservoirs in position upon the supporting-frame, and independent valves or gates controlling the independent discharge-passages, substantially as set forth.

18. In a machine of the character described, the combination of suitable feeding mechanism, and suitable paint-brushes, with a reservoir-supporting frame arranged above the plane of feed of the moldings, a sectional frame mounted upon said supporting-frame and having passage-ways formed through it between its sections, a series of approximately radial troughs or spouts leading from said discharge-passages toward the plane of feed of the moldings, means for adjusting said troughs or spouts, and reservoirs mounted upon said supporting-frame and communicating with said discharge-passages, substantially as set forth.

19. A machine for painting moldings comprising means for feeding the moldings, means for supplying the paint to the moldings, means for brushing and distributing the paint upon the moldings, and a sectional bed having its sections spaced apart beneath the discharge of the paint-supply.

EUGENE McGARRAH, Jr.

Witnesses:
 Wm. E. Knight,
 J. Green.